3,148,181
AZO DYES CONTAINING QUATERNARY
AMMONIUM SUBSTITUENTS
William E. Wallace, Rensselaer, and William H. Armento, Albany, N.Y., assignors to General Aniline & Film Corporation, New York, N.Y., a corporation of Delaware
No Drawing. Filed Apr. 13, 1961, Ser. No. 102,670
12 Claims. (Cl. 260—207)

This invention relates to novel water-soluble azo dyes capable of producing bright, light- and wash-fast dyeings on both natural and synthetic fibers. More particularly, this invention relates to novel water-soluble azo dyes having quaternary ammonium substituents, which dyes are capable of producing bright, light- and wash-fast dyeings on wool, silk, polyurethane, and polyacrylic fibers.

The dyes which are the subject of the present invention are particularly valuable for dyeing polyacrylic fibers such as Orlon and Acrilan.

In accordance with this invention there are provided water-soluble azo dyes, as above described, which have the general formula:

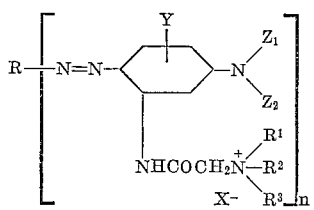

wherein R represents a moiety of a diazotizable primary amine, $R^1$, $R^2$ and $R^3$ represent lower alkyl, such as methyl, ethyl, propyl, isopropyl and butyl, lower alkylol such as hydroxyethyl and hydroxypropyl, haloalkyl such as chloroethyl, cyanoalkyl, such as cyanoethyl and cyanopropyl, benzyl, cycloalkyl such as cyclohexyl and when two or three of the R's are considered jointly, a hetero radical such as morpholino, piperidino and pyridyl, $Z_1$ and $Z_2$ represent lower alkyl such as methyl, ethyl, isopropyl, propyl and butyl, lower alkylol such as hydroxy ethyl and hydroxy propyl, haloalkyl such as chloro ethyl, cyanoalkyl, such as cyanoethyl and cyanopropyl, benzyl, cycloalkyl such as cyclohexyl, and when both $Z_1$ and $Z_2$ are considered together a hetero radical such as morpholino, piperidino and pyridyl, X represents an anion, such as chloride, sulfate, phosphate, nitrate, acetate and the like ions, and Y represents hydrogen and a non-solubilizing substituent, e.g., halogen, such as chloro and bromo, lower alkyl such as methyl and trifluoromethyl, lower alkoxy, such as methoxy, ethoxy, propoxy and butoxy, nitrilo, carbamido and lower alkyl substituted carbamido, carbalkoxy, sulfamido and lower alkyl substituted sulfamido, and wherein $n$ is 1 or 2.

The moiety of a diazotizable primary amine represented by R in the above formula includes such aromatic and heterocyclic amines as anilines, xenylamines, naphthylamines, benzidines, aminocarbazoles, aminofuranes, aminothiazoles, aminoarylsulfones, aminodiphenyl ethers, aminobenzophenones, aminofluorenones, aminoazo compounds and the like. As specific examples of some suitable diazo components, there may be mentioned aminoazotoluene, aniline, o-, m- and p-nitroaniline, 2,4-dinitroaniline, 4 - chloro-2-nitroaniline, 2-chloro-4-nitroaniline, o-toluidine, 2-nitro-p-toluidine, 5-chloro-2-toluidine, 4-nitro-o-toluidine, 2,5- and 2,6-dichloroaniline, 2,6-dichloro-4-nitroaniline, m-chloroaniline, m-bromoaniline, 4-benzoylamino-2,5-diethoxyaniline, 5-chloro-2,4-dimethoxyaniline, 4- and 5-nitro-o-anisidine, 4- and 5-chloro-o-anisidine, 1 and 2-naphthylamine, 1-aminoanthraquinone, dianisidine, 5-chloro-4-nitro-o-anisidine, $\alpha,\alpha,\alpha$-trichloro-p-toluidine, 5-chloro-$\alpha,\alpha,\alpha$-trifluoro-o-toluidine, 6-amino-2-methylbenzothiazole, 1-aminocarbazole, aminobenzophenone, aminodiphenylsulfone, 2,6-dichloro-1,4-phenylenediamine, benzidine, 4,4'-diaminostilbene, 4,4'-diaminodiphenylamine, 2,5-dimethoxy-4-(p-nitrophenylazo) aniline, 2,5 - dimethoxy-4-cyanoaniline, 2-(p-chlorophenoxy)-5-chloroaniline, 5-(diethylsulfamyl)-o-anisidine and the like.

The coupling component may be produced in any convenient manner. For example, m-nitrodialkylaniline may be reduced to N,N-dialkyl-m-phenylene diamine. Iron filings or zinc may be employed according to the method described in Beilstein 13, 40 for the reduction of m-nitrodimethylaniline. This product is then treated with chloroacetyl chloride in known manner, as for example according to the method described in Beilstein 12, 704 for the chloracylation of nitroaniline. The 1-chloro-3'-(dialkylamino) acetanilide is then quaternized by treatment with a tertiary amine to form the [(m-dialkylaminoanilino)carbonylmethyl] trimethylammonium chloride.

Alternatively, the dialkyl-m-phenylenediamine may be treated with the already quaternized trimethylammonium acetyl chloride as per the general method disclosed in U.S. Patent No. 2,359,864.

The following are representative of the coupling components which may be employed in producing the dyes of this invention:

(m-dimethylaminoanilinocarbonylmethyl)trimethylammonium chloride
(m-dimethylaminoanilinocarbonylmethyl) triethylammonium chloride
(m-dimethylaminoanilinocarbonylmethyl)methylmorpholinium chloride
(m-dimethylaminoanilinocarbonylmethyl) dimethylhydroxyethylammonium chloride
(m-dimethylaminoanilinocarbonylmethyl)trimethylammonium phosphate
(m-dimethylaminoanilinocarbonylmethyl) cyclohexyldimethylammonium chloride
(m-dimethylaminoanilinocarbonylmethyl) benzyldimethylammonium chloride
(m-dimethylaminoanilinocarbonylmethyl) methylpiperidinium chloride
(m-dimethylaminoanilinocarbonylmethyl) pyridinium chloride
(3-dimethylamino-6-chloroanilinocarbonylmethyl) trimethylammonium chloride
(3-dimethylamino-o-toluidinocarbonylmethyl) trimethylammonium chloride
(3-dimethylamino-5-carbethoxyanilinocarbonylmethyl) trimethylammonium chloride
(m-diethylanilinocarbonylmethyl) trimethylammonium chloride
(m-dibutylanilinocarbonylmethyl) trimethylammonium chloride
(m-dihydroxyethylanilinocarbonylmethyl) trimethylammonium chloride
(m-dichloroethylanilinocarbonylmethyl) trimethylammonium chloride
(m-dibenzylanilinocarbonylmethyl) trimethylammonium chloride
(m-dicyclohexylanilinocarbonylmethyl) trimethylammonium chloride
(m-dicyanoethylanilinocarbonylmethyl) trimethylammonium chloride
(m-dimethylanilinocarbonylmethyl) dimethylhydroxyethylammonium chloride
(m-dimethylanilinocarbonylmethyl) trichloroethylammonium chloride
(m-dimethylanilinocarbonylmethyl) cyanoethyldiethylammonium chloride (m-dimethyl-o-anisidinocarbonylmethyl)trimethylammonium chloride
(4-dimethylcarbamido-3-dimethylaminoanilinocarbonylmethyl)trimethylammonium chloride
(4-carbethoxy-3-dimethylaminoanilinocarbonylmethyl)trimethylammonium chloride
(m-morpholinoanilinocarbonylmethyl)trimethylammonium chloride To produce the dyes, the desired diazotizable primary amine is diazotized in suitable manner and combined with a solution of the coupling component followed by isolation of the dyestuff. Since the coupling component is water soluble, usually coupling is carried out in aqueous solution, although solvents or assistants such as ethyl alcohol, isopropanol, surfactants and the like may be present if desired. The coupling should preferably be carried out under acidic conditions, preferably at a pH of around 4–5 at a temperature under about 20° C.

The dyestuffs thus produced are water soluble dyes which dye wool, silk and wool like fibers and polyurethane fibers, but are preferably used to dye polyacrylic fibers to produce bright, light- and wash-fast dyeings on fibers such as Orlon and Acrilan.

The following examples illustrate the process in practice but the invention is not to be considered as restricted thereto. Unless otherwise stated, the parts are by weight.

*Example 1*

20 parts of p-nitroaniline is slurried with 10 parts of sodium nitrite in 160 ml. water. This is run into a mixture consisting of 170 ml. water, 33 parts of hydrochloric acid 20° Bé. and 100 parts of ice. After being held at 0–5° C. for ½ hour, the solution is checked that it is acid to Congo paper. This diazo solution is then run into a solution of 40.7 parts of (m-dimethylamino-anilinocarbonylmethyl)trimethylammonium chloride (0.15 mole) in a total volume of 500 ml. water which has been cooled to 0–5° C. Sodium acetate as crystals is added to bring the pH to 4–5. The charge is stirred until coupling is complete as indicated by the absence of excess diazo. The dyestuff is filtered and dried.

The reddish powder obtained is soluble in water and dyes acrylic fibers, e.g., Acrilan, a reddish shade having good fastness properties.

The dyestuff has the probable formula:

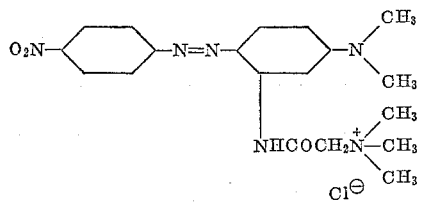

*Example 2*

The 20 parts of p-nitroaniline of Example 1 is substituted by 24.4 parts of 4-nitro-o-anisidine and a dye is produced in the manner of Example 1, which dyes acrylic fibers violet shades.

The dyestuff has the probable formula:

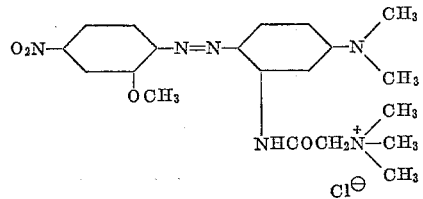

*Example 3*

A dye is produced in the manner of Example 1, only substituting 22 parts of 4-nitro-o-toluidine for the 20 parts of p-nitroaniline, which dyes acrylic fibers violet shades.

The dyestuff has the formula:

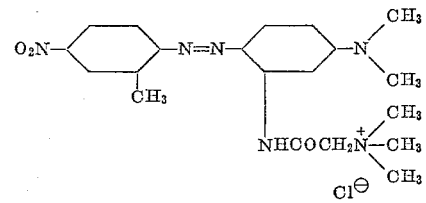

*Example 4*

A dye is produced in the manner of Example 1, only substituting 25 parts of 2-chloro-4-nitroaniline for the 20 parts of p-nitroaniline, which dyes acrylic fibers violet shades.

The dyestuff has the formula:

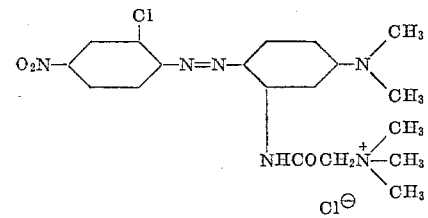

*Example 5*

A dye is produced in the manner of Example 1, only substituting 20 parts of o-nitroaniline for the 20 parts of p-nitroaniline. The resulting dye dyes acrylic fibers in bluish red shades.

The dyestuff has the formula:

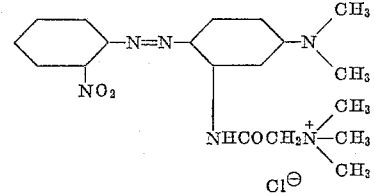

*Example 6*

20.5 parts of 5-chloro-o-toluidine is slurried in 300 parts of water and treated with 40 parts of hydrochloric acid 20° Bé. and 100 parts of ice. 10 parts of sodium nitrite is added as a 30% solution. The mixture is held at a temperature of 0–5° C. for ½ hour during which time an excess of both hydrochloric acid and nitrous acid is maintained. This diazo solution is then run into a solution of 40.7 parts of (m-dimethylaminoanilinocarbonylmethyl)trimethylammonium chloride in a total volume of 500 cc. which has been cooled to 0–5° C. Sodium acetate as crystals is added to bring the pH to 4–5. The charge is stirred until coupling is complete as indicated by the absence of excess diazo. The dyestuff is filtered and dried.

The orange powder obtained is soluble in water and dyes acrylic fibers, e.g., Acrilan, a golden yellow shade having good fastness properties.

The dyestuff has the probable formula:

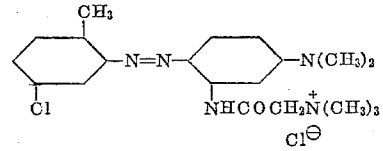

*Example 7*

A dye is produced in the manner of Example 6, only substituting 22.8 parts of 5-chloro-o-anisidine for the 20.5 parts of 5-chloro-o-toluidine. The resulting dye dyes acrylic fibers reddish-brown shades.

The dyestuff has the probable formula:

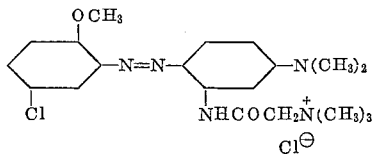

Example 8

A dye is produced in the manner of Example 6, only substituting 20 parts of m-nitroaniline for the 20.5 parts of 5-chloro-o-toluidine. The resulting dye dyes acrylic fibers reddish-yellow shades.

The dyestuff has the probable formula:

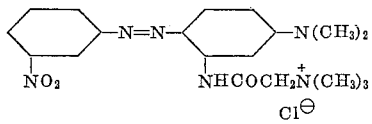

Example 9

A dye is produced similar to the manner of Example 6, only substituting 23.5 parts of 2,5-dichloroaniline for the 20.5 parts of 5-chloro-o-toluidine. The resulting dye dyes acrylic fibers orange shades.

The dyestuff has the probable formula:

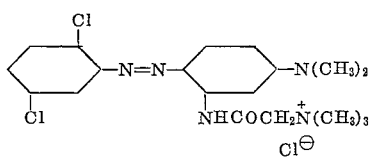

Example 10

A dye is produced in the manner of Example 1, only substituting 22 parts of 2-nitro-p-toluidine for the 20 parts of p-nitroaniline. The resulting dye dyes acrylic fibers a reddish brown shade.

The dyestuff has the probable formula:

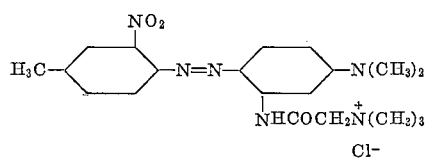

Example 11

A dye is produced in the manner of Example 6, only substituting 24.3 parts of 5-nitro-o-anisidine for the 20.5 parts of 5-chloro-o-toluidine. The resulting dye dyes acrylic fibers orange shades.

The dyestuff has the probable formula:

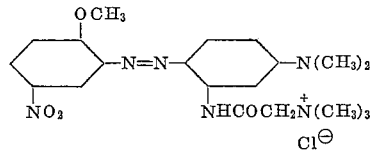

| Example No. | Diazo Base | Coupler | Shade |
|---|---|---|---|
| 12 | Aniline | m-(Dimethylaminoanilinocarbonylmethyl)trimethylammonium chloride. | Yellow-orange. |
| 13 | o-Toluidine | do | Golden yellow. |
| 14 | 2-Naphthylamine | do | Reddish yellow. |
| 15 | 5-Chloro-2,4-dimethoxy-aniline. | do | Brown. Do. |
| 16 | 4-Chloro-2-nitro-aniline. | do | Brick red. |

Example 17

20 parts of p-nitroaniline is diazotized and coupled in the manner of Example 1 with 47.0 parts of (m-dimethylaminoanilinocarbonylmethyl)triethylammonium chloride to yield a dye which has good fastness properties when dyed on Acrilan.

Example 18

20 parts of p-nitroaniline is diazotized and coupled in the manner of Example 1 with 43.7 parts of (m-dimethylaminoanilinocarbonylmethyl)pyridinium chloride to yield a dye which has good fastness properties when dyed on Acrilan.

Example 19

20 parts of p-nitroaniline is diazotized and coupled in the manner of Example 1 with 46.7 parts of (m-dimethylaminoanilinocarbonylmethyl)dimethylhydroxyethylammonium chloride to yield a dye which has good fastness properties when dyed on Acrilan.

Example 20

20 parts of p-nitroaniline is diazotized and coupled in the manner of Example 1 with 44.8 parts of (m-diethylaminoanilinocarbonylmethyl)trimethylammonium chloride to yield a dye which has good fastness properties when dyed on Acrilan.

Example 21

20 parts of p-nitroaniline is diazotized and coupled in the manner of Example 1 with 53.2 parts of (m-dibutylaminoanilinocarbonylmethyl)trimethylammonium chloride.

Example 22

20 parts of p-nitroaniline is diazotized and coupled in the manner of Example 1 with 46.9 parts of (m-morpholinocarbonylmethyl)trimethylammonium chloride.

Example 23

*Preparation of (m-dimethylaminoanilinocarbonylmethyl)trimethylammonium chloride.*—A 1 liter 3 necked flask, equipped with thermometer and condenser, is charged with 300 cc. of water, 150 grams of iron borings, 12 cc. of hydrochloric acid 20° Bé. and heated to 95–100° C. to etch the iron. Over a period of ¾ hour 108 grams of m-nitrodimethylaniline is added. The temperature is maintained at 95–100° C. for 2 hours. Soda ash is added to alkalinity (pH 8.5). It is clarified from the iron sludge. Hydrochloric acid is added to a pH of 6.7. It is iced in a 2 liter flask to 0° C. 200 grams of sodium acetate crystals are added. 125 grams of chloroacetyl chloride are added. It is stirred for 2 hours at 5–15° C., filtered and washed neutral.

To quaternize, a 1 liter flask is charged with 250 cc. of water, 125 grams of trimethylamine, and all of the paste on the filter. It is stirred at room temperature overnight, maintaining alkaline to phenolphthalein by addition of trimethylamine if necessary. After 18 hours it is heated to 60–65° C. and held 3 hours with a positive phenolphthalein test, neutralized with hydrochloric acid to a pH of 4–5. The solution is ready for coupling. Alternatively the product can be isolated if desired by evaporating to crystallinity.

Example 24

A 5 gram swatch of regular type Acrilan acrylic fiber is dyed as follows: the material is entered into a bath at 120° F. consisting of 350 cc. of water, 1% of the dye of Example 1, 1% of Igepal CO–710 (commercially available surfactant) and 3% of urea. These percentages are based on the weight of the fiber. The temperature is raised to the boil. Dyeing is continued for 1½ hours, the bath is gradually cooled to 160° F., the material rinsed and dried.

It is to be understood that the foregoing detailed description is given by way of illustration and that many variations may be made therein without departing from the spirit of this invention.

What is claimed is:

1. A water-soluble dyestuff having the following formula:

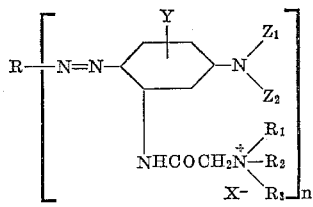

wherein R represents the moiety of a diazotizable primary amine selected from the group consisting of aminoazotoluene, aniline, o-nitroaniline, m-nitroaniline, p-nitroaniline, 2,4-dinitroaniline, 4-chloro-2-nitroaniline, 2-chloro-4-nitroaniline, o-toluidine, 2-nitro-p-toluidine, 5-chloro-o-toluidine, 4-nitro-o-toluidine, 2,5-dichloroaniline, 2,6-dichloroaniline, 2,6-dichloro-4-nitroaniline, m-chloroaniline, m-bromoaniline, 4-benzoylamino-2,5-diethoxyaniline, 5-chloro-2,4-dimethoxyaniline, 4-nitro-o-anisidine, 5-nitro-o-anisidine, 4-chloro-o-anisidine, 5-chloro-o-anisidine, 1-naphthlyamine, 2-naphthlyamine, 1-aminoanthraquinone, dianisidine, 5-chloro-4-nitro-o-anisidine, α,α,α-trichloro-p-toluidine, 5 - chloro-α,α,α-trifluoro-o-toluidine, 6-amino-2-methylbenzothiazole, 1-aminocarbazole, aminobenzophenone, aminodiphenylsulfone, 2,6-dichloro-1,4-phenylenediamine, benzidine, 4,4'-diaminostilbene, 4,4'-diaminodiphenylamine, 2,5 - dimethoxy-4-(p-nitrophenylazo) aniline, 2,5-dimethoxy-4-cyanoaniline, 2-(p-chlorophenoxy) - 5 - chloroaniline, 5-(diethylsulfamyl)-o-anisidine, $R^1$, $R^2$ and $R^3$ are selected from the group consisting of lower alkyl, lower alkylol, chloroethyl, lower cyanoalkyl, benzyl, cycloalkyl, and wherein two of said $R_1$, $R_2$ and $R_3$, when taken together with the nitrogen atom to which they are attached, form a heterocyclic radical selected from the group consisting of morpholino, piperidino and pyridyl, $Z_1$ and $Z_2$ are selected from the group consisting of lower alkyl, lower alkylol, chloroethyl, lower cyanoalkyl, benzyl, cyclohexyl, and wherein $Z_1$ and $Z_2$, when taken together with the nitrogen atom to which they are attached, form a heterocyclic radical selected from the group consisting of morpholino, piperidino and pyridyl, X is an anion, Y is selected from the group consisting of hydrogen, halo selected from the group consisting of chloro and bromo, lower alkyl, lower alkoxy, lower alkyl substituted carbamido, and carbethoxy, and wherein $n$ is an integer from 1 to 2.

2. A dyestuff having the formula:

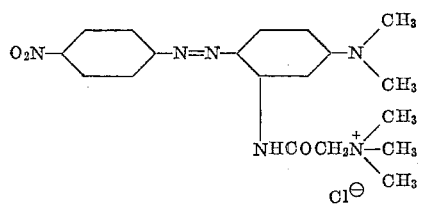

3. A dyestuff having the formula:

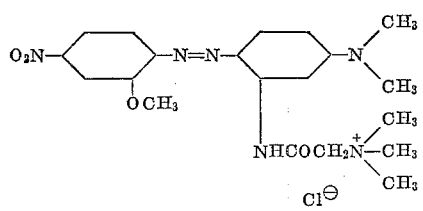

4. A dyestuff having the formula:

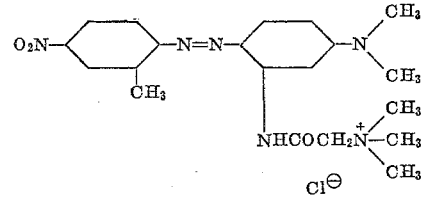

5. A dyestuff having the formula:

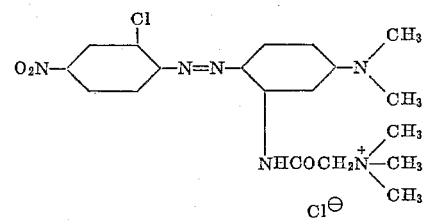

6. A dyestuff having the formula:

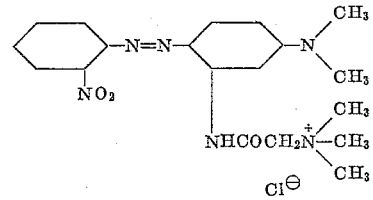

7. A dyestuff having the formula:

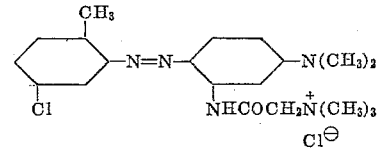

8. A dyestuff having the formula:

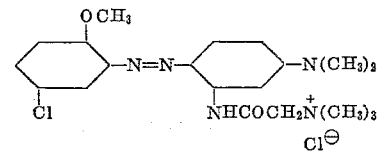

9. A dyestuff having the formula:

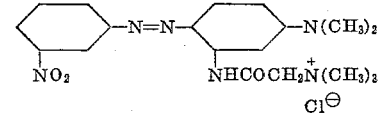

10. A dyestuff having the formula:

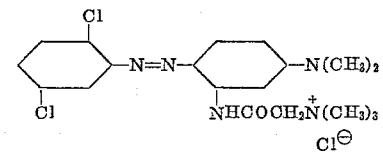

11. A dyestuff having the formula:

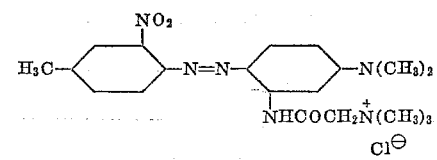

12. A dyestuff having the formula:
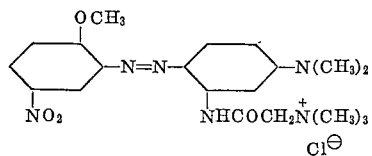
References Cited in the file of this patent
UNITED STATES PATENTS
| | | | |
|---|---|---|---|
| 2,359,864 | Linch | Oct. 10, | 1944 |
| 2,853,483 | Rhyner | Sept. 23, | 1958 |
| 2,971,953 | Rhyner | Feb. 14, | 1961 |